US009639966B2

(12) United States Patent
Oshima et al.

(10) Patent No.: US 9,639,966 B2
(45) Date of Patent: May 2, 2017

(54) VISUALLY DISPLAYING A PLURALITY OF ATTRIBUTES OF SOUND DATA

(71) Applicant: Yamaha Corporation, Hamamatsu-shi, Shizuoka-ken (JP)

(72) Inventors: Osamu Oshima, Hamamatsu (JP); Motoji Nagata, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 24 days.

(21) Appl. No.: 13/727,412

(22) Filed: Dec. 26, 2012

(65) Prior Publication Data

US 2013/0162649 A1  Jun. 27, 2013

(30) Foreign Application Priority Data

Dec. 27, 2011  (JP) ................... 2011-286727

(51) Int. Cl.
*G06T 11/20* (2006.01)
*G10H 1/36* (2006.01)

(52) U.S. Cl.
CPC ........... *G06T 11/206* (2013.01); *G10H 1/361* (2013.01); *G10H 2210/066* (2013.01); *G10H 2220/015* (2013.01)

(58) Field of Classification Search
None
See application file for complete search history.

(56) References Cited

U.S. PATENT DOCUMENTS

| 4,868,687 | A |  | 9/1989 | Penn et al. |
| 5,287,789 | A | * | 2/1994 | Zimmerman ........ G09B 15/00 84/454 |
| 6,064,964 | A |  | 5/2000 | Yamamoto et al. |
| 6,245,984 | B1 |  | 6/2001 | Aoki et al. |
| 6,411,289 | B1 | * | 6/2002 | Zimmerman ................ 715/243 |

(Continued)

FOREIGN PATENT DOCUMENTS

| JP | 2004-139124 A | 5/2004 |
| JP | 2008-165130 A | 7/2008 |
| JP | 2008-225117 A | 9/2008 |

(Continued)

OTHER PUBLICATIONS

Notice of Submission of Opinion mailed Dec. 17, 2013, for Korean patent application No. 10-2012-0151892, with English translation, 12 pages.

(Continued)

*Primary Examiner* — Barry Drennan
*Assistant Examiner* — Diana Hickey
(74) *Attorney, Agent, or Firm* — Morrison & Foerster LLP

(57) ABSTRACT

A control section analyzes sound data to acquire data indicative of a plurality of attributes, such as pitch and volume, and displays, on a display screen, graphics indicative of the acquired pitch and volume. At that time, the control section displays, on the display screen, a pitch curve where a value of pitch is represented by the vertical axis while the passage of time is represented by the horizontal axis. Also, at a position on the display screen based on a displayed position of the pitch curve, the control section displays a volume graphic where a level of volume is represented by a length or distance or width, in the vertical-axis direction, of the volume graphic.

11 Claims, 6 Drawing Sheets

(56) References Cited

U.S. PATENT DOCUMENTS

2006/0011046 A1     1/2006    Miyaki et al.
2007/0168187 A1*   7/2007    Fletcher .................. G09B 5/04
                                                                              704/209

FOREIGN PATENT DOCUMENTS

| JP | 2010-128158 A | 6/2010 |
|----|---------------|--------|
| JP | 2011-209459 A | 10/2011 |
| JP | 2011-209654 A | 10/2011 |
| KR | 101025665 B1 | 3/2011 |

OTHER PUBLICATIONS

Office Action dated Aug. 1, 2014 issued for Taiwan Patent Application No. 101149621 with English translation, 11 pages.

Notice of Submission of Opinion mailed Aug. 25, 2014, for Korean Patent Application No. 10-2012-0151892, with English translation, 9 pages.

Chinese Search Report dated Sep. 2, 2014, for CN Application No. 2012105801064, with English translation, 4 pages.

Chinese Notification of the First Office Action dated Sep. 2, 2014, for CN Application No. 2012105801064, with English translation, 12 pages.

Notice of Grounds for Rejection (Office Action) mailed Jun. 23, 2015, for Japanese patent application No. JP 2011-286727, with English translation, six pages.

Chinese Notification of the Second Office Action dated Jun. 1, 2015, for CN Application No. 201210580106.4, with English translation, 7 pages.

Extended European Search Report dated Jun. 23, 2016, for EP Application No. 12199160.8, seven pages.

* cited by examiner

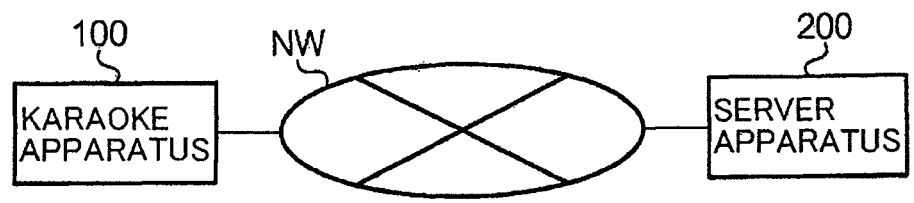
F I G. 1
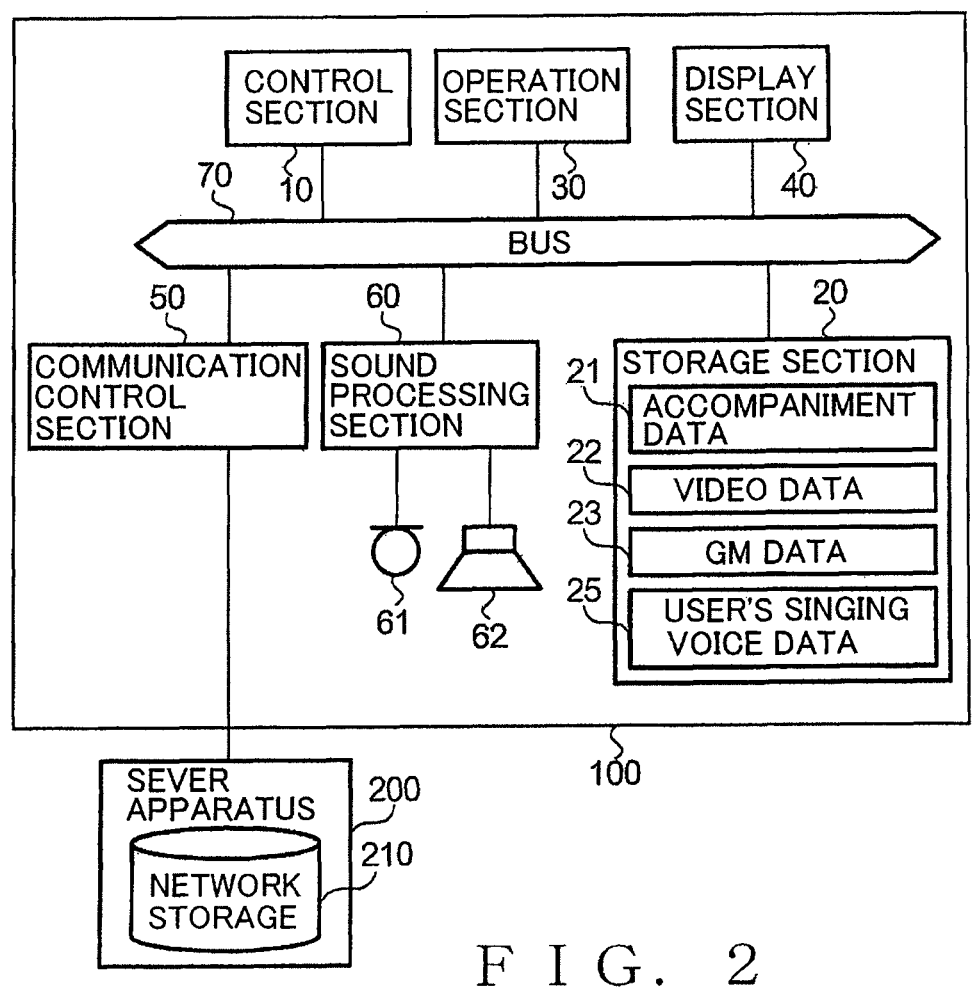
F I G. 2

VISUALLY DISPLAYING A PLURALITY OF ATTRIBUTES OF SOUND DATA

BACKGROUND

The present invention relates to a display control apparatus and method for visually displaying a plurality of attributes, such as pitch and volume, possessed by sound data like singing voice data.

There have heretofore been proposed various karaoke apparatus having a function for scoring a singing skill or performance of a singer. Also, for such karaoke apparatus, there has been proposed a function for displaying a melody of a music piece and singing of a singer in graphic form with a view to presenting the melody of the music piece in a manner easy for the singer to grasp or understand and allowing the singer to check its singing performance. Further, Japanese Patent Application Laid-open Publication No. 2004-139124 (hereinafter referred to as "the relevant patent literature") discloses a technique for not only displaying notes, indicative of a melody of a music piece, on a staff but also displaying images or graphics indicative of a volume variation and a pitch variation per note.

A human voice always varies in pitch and volume. With the technique disclosed in the relevant patent literature, however, only one piece of additional information (i.e., attribute) can be depicted per note; that is, a plurality of attributes, such as pitch and volume, cannot be depicted per note.

SUMMARY OF THE INVENTION

In view of the foregoing prior art problems, it is an object of the present invention to provide a technique for displaying a plurality of attributes possessed by sound data in a manner easy for a user to grasp the attributes.

In order to accomplish the above-mentioned object, the present invention provides an improved display control apparatus, which comprises: an acquisition section configured to acquire attribute data indicative of two or more attributes of sound data; a display control section configured to perform control for displaying variations over time in values of the two or more attributes indicated by the attribute data acquired by the acquisition section, wherein, on a coordinate plane with a first axis indicative of the passage of time and a second axis intersecting the first axis, the display control section displays a value of a first attribute of the two or more attributes by a coordinate position along the second axis, and also display a first graphic where a value of a second attribute of the two or more attributes is indicated by a length extending in a direction of the second axis. With the present invention arranged in the aforementioned manner, it is possible to display a plurality of attributes, included in sound data, in combination in a manner easy for a user to grasp.

In a preferred embodiment of the present invention, the display control section performs control for displaying a second graphic, indicative of a value of the first attribute, in association with the above-mentioned coordinate position.

In a further preferred embodiment of the present invention, the display control section performs control for displaying the first graphic in such a manner that the coordinate position indicative of the value of the first attribute is located at the center or upper or lower end, in the direction of the second axis, of the first graphic.

In a further preferred embodiment of the present invention, the display control apparatus further comprises a reception section configured to receive model attribute data indicative of a model value of the first attribute, and the display control section performs control for displaying, on the coordinate plane, a graphic representative of the model value indicated by the model attribute data.

The present invention may be constructed and implemented not only as the apparatus invention discussed above but also as a method invention. Also, the present invention may be arranged and implemented as a software program for execution by a processor, such as a computer or DSP, as well as a non-transitory storage medium storing such a software program. In this case, the program may be provided to a user in the storage medium and then installed into a computer of the user, or delivered from a server apparatus to a computer of a client via a communication network and then installed into the client's computer. Further, the processor used in the present invention may comprise a dedicated processor with dedicated logic built in hardware, not to mention a computer or other general-purpose processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 1 is a diagram showing a general construction of a system employing an embodiment of the present invention;

FIG. 2 is a block diagram showing a hardware construction of a karaoke apparatus in the system of FIG. 1;

DETAILED DESCRIPTION

<General Construction of Embodiment>

Figure 3:
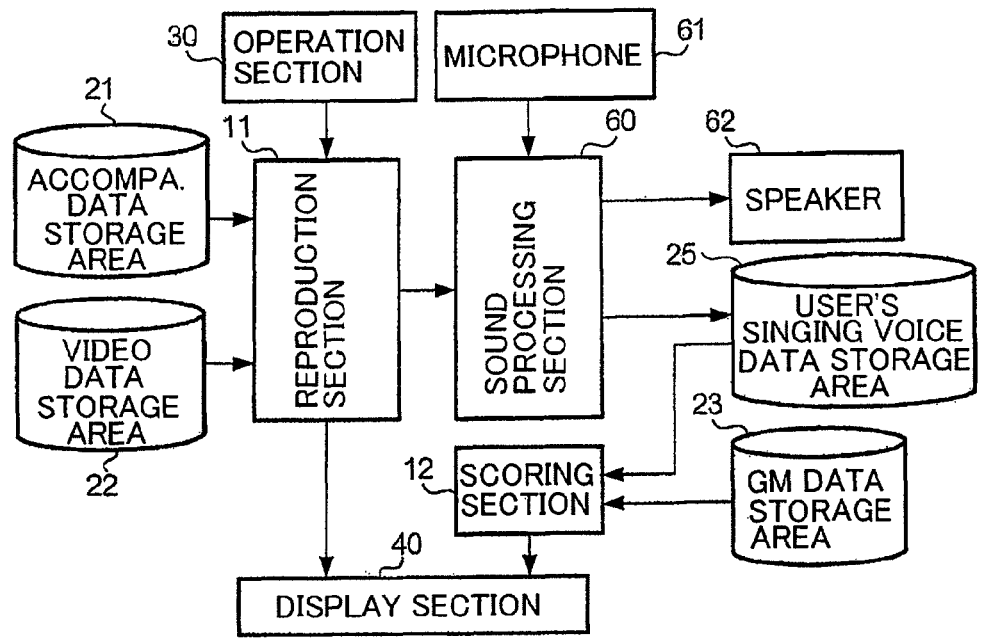
FIG. 3 is a block diagram showing an example of functional arrangements of the karaoke apparatus in the system of FIG. 1.

FIG. 1 is a diagram showing a construction of a system employing a preferred embodiment of the present invention. The system comprises a karaoke apparatus 100, a server apparatus 200, and a network NW. The karaoke apparatus 100 is constructed to not only reproduce a karaoke music piece in accordance with a user's request but also evaluate user's singing along to the reproduced karaoke music piece. The karaoke apparatus 100 is an embodiment of a display control apparatus of the present invention. The network NW is a LAN (Local Area Network) or the Internet over which data communication is performed between the karaoke apparatus 100 and the server apparatus 200. The server apparatus 200 has a storage section, such as an HDD (Hard Disk Drive), provided inside or outside it and having stored therein various data, such as content data related to karaoke music pieces, and the server apparatus 200 is constructed to supply the content data to the karaoke apparatus 100 in accordance with a request from a user. Here, each item of the "content" comprises a combination of audios and videos of a karaoke music piece. Namely, each content data comprises so-called accompaniment data indicative of an accompaniment and chorus without including singing voice of a melody of a music piece, and video data indicative of lyrics of the music piece and videos to be displayed on a background of the lyrics. Note that a plurality of the karaoke apparatus 100 may exist for the one server apparatus 200. Conversely, a plurality of the server apparatus 200 may exist for the one karaoke apparatus 100. Note that the term "sound" used herein refers to any of various types of sounds, such voice uttered by a human and performance sound of a musical instrument.

FIG. 2 is a block diagram showing a hardware construction of the karaoke apparatus 100 in the system of FIG. 1. As shown, the karaoke apparatus 100 includes a control section 10, a storage section 20, an operation section 30, a display section 40, a communication control section 50, a sound processing section 60, a microphone 61 and a speaker 62, which are interconnected via a bus 70. The control section 10 includes a CPU (Central Processing Unit), a RAM (Random Access Memory), a ROM (Read-Only Memory), etc. In the control section 10, the CPU controls various sections of the karaoke apparatus 100 by reading out a computer program stored in the ROM or storage section 20 and loading the read-out computer program into the RAM.

The operation section 30 includes various operators and outputs operation signals, indicative of various user's operation to the control section 10. The display section 40 includes for example a liquid crystal panel, and under control of the control section 10, the display section 40 displays various images, such as lyrics telops and background videos, corresponding to individual karaoke music pieces. The communication control section 50 interconnects the karaoke apparatus 100 and the network NM in a wired or wireless manner and controls data communication between the karaoke apparatus 100 and the server apparatus 200 performed over the network NM.

The server apparatus 200 is a computer including a CPU and various memories (not shown); particularly, the server apparatus 200 includes a network storage 210. The network storage 210 is for example an HDD, which stores therein various data, such as content data of karaoke music pieces. Whereas the server apparatus 200 is shown in FIG. 2 as including one network storage 210, the number of the network storage 210 is not so limited, and the server apparatus 200 may include a plurality of the network storages 210. In the case where content data of a karaoke music piece reserved by the user is prestored in the network storage 210, the karaoke apparatus 100 communicates with the server apparatus 200 under control of the communication control section 50 to perform streaming reproduction where, while downloading via the network NW the content data read out from the network storage 210, the karaoke apparatus 100 sequentially reproduces downloaded portions of the content data.

The microphone 61 outputs, to the sound processing section 60, an audio signal indicative of voice picked up thereby. The sound processing section 60 includes an A/D (Analog-to-Digital) converter for converting the analog audio signal into digital sound data and outputting the digital sound data to the control section 10, so that the control section 10 receives the digital sound data. The sound processing section 60 further includes a D/A (Digital-to-Analog) converter for converting digital sound data, received from the control section 10, into an analog audio signal and outputting the converted analog audio signal to the speaker 62, so that the speaker 62 audibly outputs a sound based on the analog audio signal received from the sound processing section 60. Note that, whereas the instant embodiment is described here in relation to the case where the microphone 61 and the speaker 62 are included in the karaoke apparatus 100, only input and output terminals may be provided in the sound processing section 60, without the microphone 61 and the speaker 62 being included in the karaoke apparatus 100 in this case, an external microphone may be connected to the input terminal of the sound processing section 60 via an audio cable while an external speaker is connected to the output terminal of the sound processing section 60 via an audio cable. Further, whereas the instant embodiment is described here in relation to the case where the audio signal output from the microphone 61 to the speaker 62 is an analog audio signal, a digital audio signal may be output and input. In such a case, there is no need for the sound processing section 60 to perform A/D conversion and D/A conversion. Similarly, the operation section 30 and the display section 40 too may include their respective external output terminals for connection thereto an external monitor.

The storage section 20 is a storage means, such as an HDD or non-volatile memory, for storing therein various data. The storage section 20 includes a plurality of storage areas, such as an accompaniment data storage area 21, a video data storage area 22, a guide melody (hereinafter "GM") data storage area 23 and a user's singing voice data storage area 25.

The accompaniment data storage area 21 has prestored therein information related to accompaniment data indicative of accompaniment sounds of various music pieces. Each accompaniment data, which is for example a data file of a MIDI (Musical Instrument Digital Interface) format, is imparted with music-piece-related information, such as a music piece number uniquely identifying the music piece in question and a music piece name indicative of the name of the music piece. The video data storage area 22 has prestored therein lyrics data indicative of lyrics of various music pieces and background video data indicative of background videos to be displayed on the background of the lyrics. At the time of karaoke singing, the lyrics indicated by the lyrics data are displayed as a lyrics telop on the display section 40 as the music piece progresses. The background image indicated by the background video data is displayed, at the time of karaoke singing, on the display section 40 as a background of a lyrics telop as the music piece progresses. The GM data storage area 23 has prestored therein data indicative of melodies of vocal parts of music pieces, i.e. guide melody data (hereinafter "GM data") that are data designating component notes to be sung. Namely, the GM data, which is described for example in the MIDI format, is indicative of model sound pitches. Such GM data is used by the control section 10 as a comparison standard or reference when evaluating a user's singing skill or performance of a music piece. An evaluation process performed by the control section 10 will be described in detail later.

The user's singing voice data storage area 25 stores therein sound data generated, for each music piece sung as karaoke, by the sound processing section 60 converting, into digital data, user's singing voice picked up by the microphone 61 during reproduction of the corresponding accompaniment data. Such sound data, which will hereinafter referred to as "user's singing voice data", is stored as a data file for example in a WAVE format (RIFF waveform Audio Format). The user's singing voice data of individual music pieces are associated by the control section 10 with the GM data of the music pieces.

FIG. 3 is a block diagram showing an example of functional arrangements of the karaoke apparatus 100. In FIG. 3, a reproduction section 11 and a scoring section 12 are implemented by the CPU of the control section 10 reading out a computer program prestored in the ROM or storage section 20 and loading the read-out computer program into the RAM. The reproduction section 11 reproduces a karaoke music piece. More specifically, the reproduction section 11 not only audibly outputs, via the speaker 62, sounds based on the accompaniment data and GM data but also displays, via the display section 40, videos based on the video data.

The scoring section 12 evaluates the sound data (user's singing voice data) indicative of user's (singer's) singing voice. Namely, the scoring section 12 evaluates the user's singing performance in accordance with differences between pitches of the singing voice and pitches of the GM data.

Figure 4:
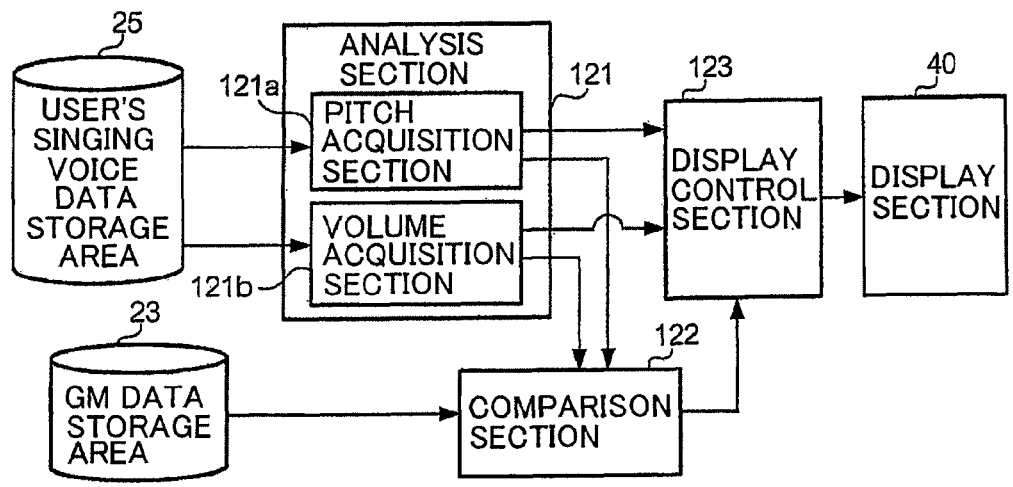
FIG. 4 is a block diagram showing an example of functional arrangements of a scoring section of the karaoke apparatus in the system of FIG. 1.

FIG. 4 is a block diagram showing an example of functional arrangements of the scoring section 12. In FIG. 4, an analysis section (attribute data acquisition section) 121 analyzes the user's singing voice data for two or more voice (sound) attributes and outputs attribute data indicative of the analyzed attributes. In the instant embodiment, the pitch and volume are used as the voice attributes (i.e., first and second attributes, respectively). The analysis section (attribute data acquisition section) 121 includes a pitch acquisition section 121a and a volume acquisition section 121b. The pitch acquisition section 121a analyzes the user's singing voice data stored in the user's singing voice data storage area 25 to detect pitches of the singing voice. The pitch acquisition section 121a outputs data indicative of the detected pitch (hereinafter referred to as "pitch data"). The volume acquisition section 121b detects volume of the user's singing voice data stored in the user's singing voice data storage area 25. The volume acquisition section 121b outputs data indicative of the detected volume (hereinafter referred to as "volume data").

A comparison section 122 compares a pitch of the user's singing voice data acquired by the pitch acquisition section 121a and a pitch of the GM data and performs a scoring process on the user's singing voice data in accordance with a difference between the compared pitches. More specifically, for example, the comparison section 122 compares a pitch variation of voice indicated by the user's singing voice data and a pitch variation of a guide melody indicated by the GM data and then calculates an evaluation value indicative of a degree of coincidence between the compared pitch variations. For example, for a given note, the evaluation value may be calculated as 100% (meaning no demerit or deducting point) if the pitch difference falls within a predetermined allowable range, or calculated as 50% if a length of a time period over which the pitch difference does not fall within the allowable range is half a sound length of the note in the GM data. Namely, the evaluation value for a note is calculated by dividing the length of the time period over which the pitch difference falls within the allowable range by the sound length of the note in the GM data. The control section 10 determines a deducting point on the basis of the calculated evaluation value. For example, in a case where "two points" is pre-assigned to a given note and if the evaluation value has been calculated as 50%, the control section 10 determines "one point" as the deducting point. Alternatively, the comparison section 122 may perform the scoring process taking into account a volume of the user's singing voice data acquired by the volume acquisition section 121b.

A display control section 123 displays, on the display section 40, a scoring result output by the comparison section 122. The display control section 123 functions not only as a reception section for receiving attribute data output from the analysis section 121, but also as a display control section for displaying, on the display section 40, variations over time (timewise variations) of values of two or more voice attributes indicated by the received attribute data. The following describes, with reference to the drawings, a display control process performed by the display control section 123.

Figure 5:
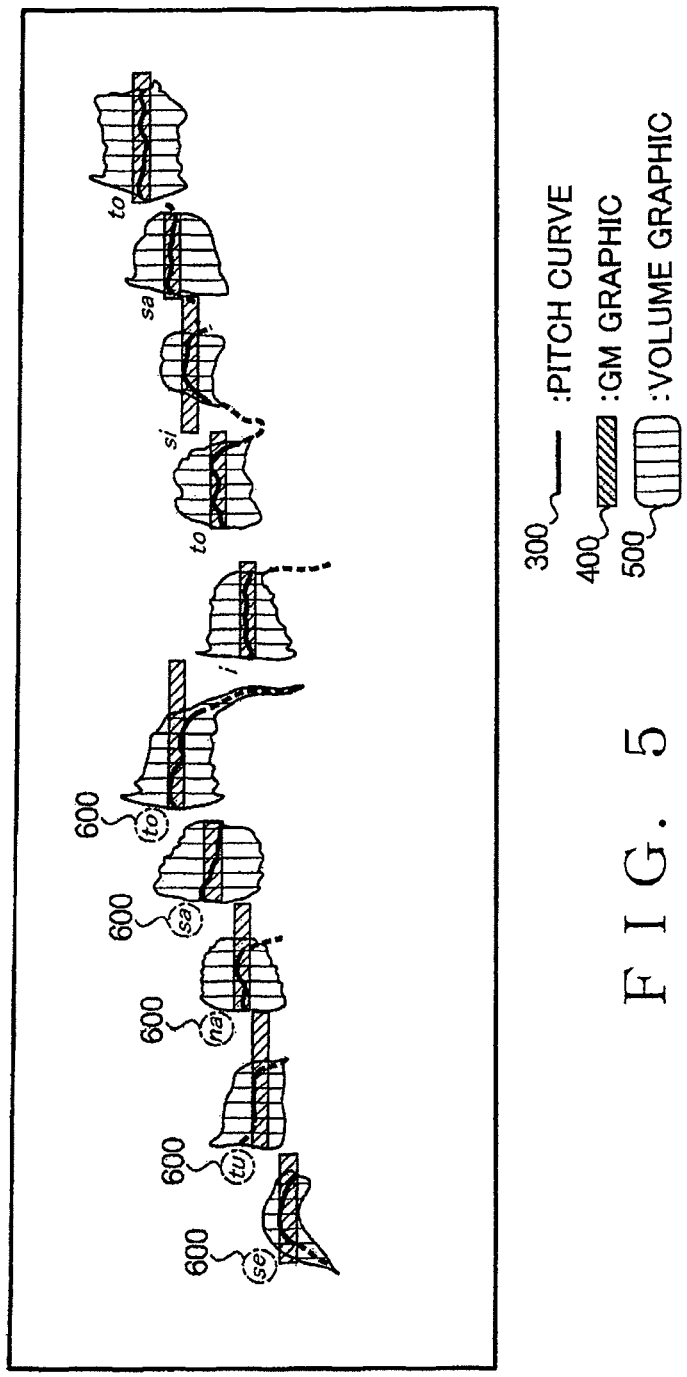
FIG. 5 is a diagram showing an example of a screen displayed on a display section of the karaoke apparatus.

FIG. 5 is a diagram showing an example of a screen displayed on the display section 40 under control of the display control section 123. The screen of FIG. 5, where the horizontal axis represents the passage of time while the vertical axis represents the pitch, is constructed to make displays related to attribute data on a two-axis coordinate plane with the time-passage-representing first axis (horizontal axis) and the pitch-representing second axis (vertical axis) intersecting the first axis. In the figure, each solid line 300 represents a pitch variation over time of user's singing voice data of a note and will hereinafter be referred to as "pitch curve 300". Namely, the display control section 123 indicates a value of the pitch (first attribute), acquired by the pitch acquisition section 121a, by a coordinate position along the second axis (pitch axis). A timewise variation of the thus-indicated value of the pitch constitutes the pitch curve 300. As will be later described, the pitch curve 300 serves as a reference for displaying, on the display section 40, a value of the volume (second attribute) at each time point. In the instant embodiment, the vertical axis (second axis) functions both as the pitch axis and as the volume axis. Namely, a value of the pitch (first attribute) is represented by an absolute value along the vertical axis (second axis), while a value of the volume (second attribute) is represented by a relative value along the vertical axis (second axis), i.e. by a relative value based on the coordinate position corresponding to the pitch.

Further, the display control section 123 displays a volume graphic (first graphic) 500 indicating, by a length extending in the vertical-axis direction (i.e., direction of the second axis) from a coordinate position at each time point of the pitch curve 300, a value of the volume (second attribute) at that time point. In this case, the display control section 123 displays the volume graphic 500 by relative values to the pitch curve 300 in such a manner that absolute coordinate positions, in the vertical-axis direction, of the pitch curve 300 become central coordinate positions of the volume graphic 500. As an example, the volume graphic (first graphic) 500 is displayed in such a manner as to simulate positive and negative envelopes of a volume amplitude waveform swinging in positive and negative directions from an amplitude center. Namely, the volume graphic 500 has a shape vertically symmetrical with respect to the pitch curve 300, and a greater amplitude, in the vertical-axis direction, of the volume graphic 500 represents a greater volume. Note that, in the illustrated example of FIG. 5, the pitch curve 300 is displayed not only merely as the reference, but also as a visible curve graphic (second graphic) in order to visibly represent values of the pitch (first attribute).

Further, in FIG. 5, each belt-shaped graphic 400 represents a pitch of the GM data (model attribute data) and will hereinafter be referred to as "GM graphic 400". The GM data (model attribute data) indicates a model value of the pitch (first attribute). The display control section 123 also functions as a reception section for receiving the GM data (model attribute data). The display control section 123 displays the GM graphic 400, representative of a pitch indicated by the received GM data, at a position (coordinates) along the vertical and horizontal axes. Further, the display control section 123 displays letter graphics indicative of lyrics 600 (hereinafter referred to as "lyrics graphics 600") as related information on the screen of FIG. 5 near corresponding ones of the GM graphics 400. Alternatively, the display control section 123 may display the lyrics graphics 600 in overlapped or superimposed relation to the GM graphics 400.

<Behavior>

Figure 6:
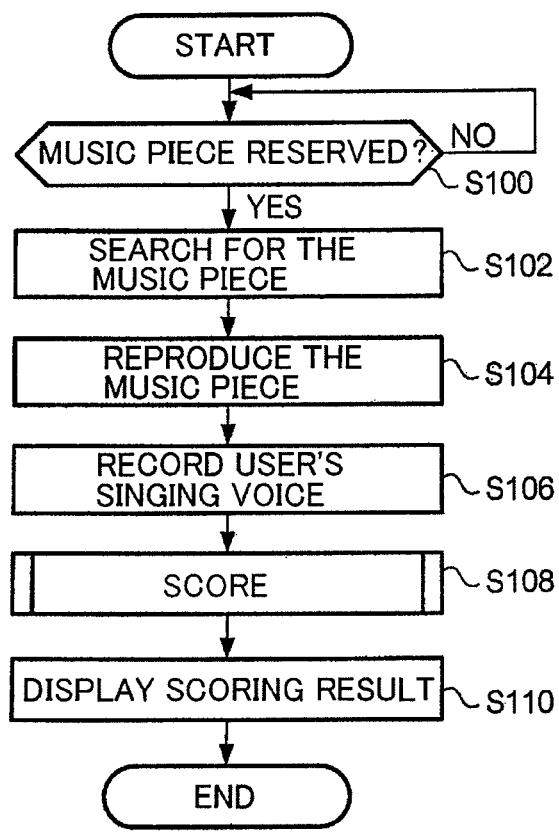
FIG. 6 is a flow chart showing an example operational sequence performed by a control section of the karaoke apparatus.

FIG. 6 is a flow chart showing an example operational sequence performed by the control section 10. Once a user-selected music piece is reserved by the user via the operation section 30 (YES determination at step S100), the control section 10 searches through the storage section 20 for the reserved music piece at step S102. More specifically, at step S102, using the music piece number or name of the selected music piece as a search key, the control section 10 searches through the accompaniment data storage area 21, video data storage area 22 and GM data storage area 23 for data related to the music piece and reads out data searched out by the search (searched-out data) into the RAM.

Then, at step S104, the control section 10 reproduces the karaoke music piece on the basis of the accompaniment data, video data and GM data stored in the RAM as above. More specifically, at step S104, the control section 10 audibly reproduces sounds based on the accompaniment data and GM data through the speaker 62, but also displays videos based on the video data on the display section 40. Then, at step S106, the control section 10 stores, into the user's singing voice data storage area 25, user's singing voice data generated by the sound processing section 60 converting user's singing voice, picked up via the microphone 61, into digital data. Then, upon completion of the reproduction of the karaoke music piece, the control section 10 scores the user's singing on the basis of the user's singing voice data stored in the user's singing voice data storage area 25 and the GM data, at step S108. Then, at step S110, the control section displays a scoring result of the user's singing on the display section 40.

At step S110, the control section 10 displays, on the display section 40, letters/characters and image indicative of the scoring result, but also an analyzed result of the singing voice as illustratively shown in FIG. 5. On the screen illustratively shown in FIG. 5, a plurality of attributes (pitch and volume) are simultaneously displayed, as the analyzed result of the singing voice, using the common time axis. Because volumes are indicated by displayed widths of the volume graphics 500 that are displayed superimposed on the pitch curves 300, the user can readily intuitively grasp both the volumes and pitches by following the pitch curves 300 with the eyes.

<Modifications>

The above-described embodiment can be modified variously as follows, and such modifications may be practiced in combination as necessary.

<Modification 1>

Whereas the preferred embodiment has been described above in relation to the case where the attributes of voice to be analyzed by the control section 10 are volume and pitch, such attributes of voice (sound) to be analyzed by the control section 10 may be any other attribute than the volume and pitch, such as articulation or clarity and sound generation timing (vocalizing timing), as long as the attributes of voice represent characters or properties of voice. In the case where the articulation of voice is used as the attribute to be analyzed, for example, the control section 10 may detect spectra from the voice by use of an FFT (Fast Fourier Transform) technique and calculate the articulation on the basis of a ratio between levels at positions where a level variation appears as a formant (i.e., formant levels) and levels at troughs where a level variation appears as a trough (trough levels). More specifically, the control section 10 may, for example, perform an articulation calculation process such that the greater the ratio of the formant levels to the trough levels, the higher becomes the articulation. Further, in the case where the sound generation timing or vocalizing timing is used as the attribute to be analyzed, the control section 10 may detect vocalizing timing of each phoneme (note) of the lyrics from the user's singing voice data and display a graphic where the greater a difference between the detected vocalizing timing and the model vocalizing timing (indicated by the GM data), the greater becomes the displayed width in the vertical-axis direction.

<Modification 2>

Figure 7:
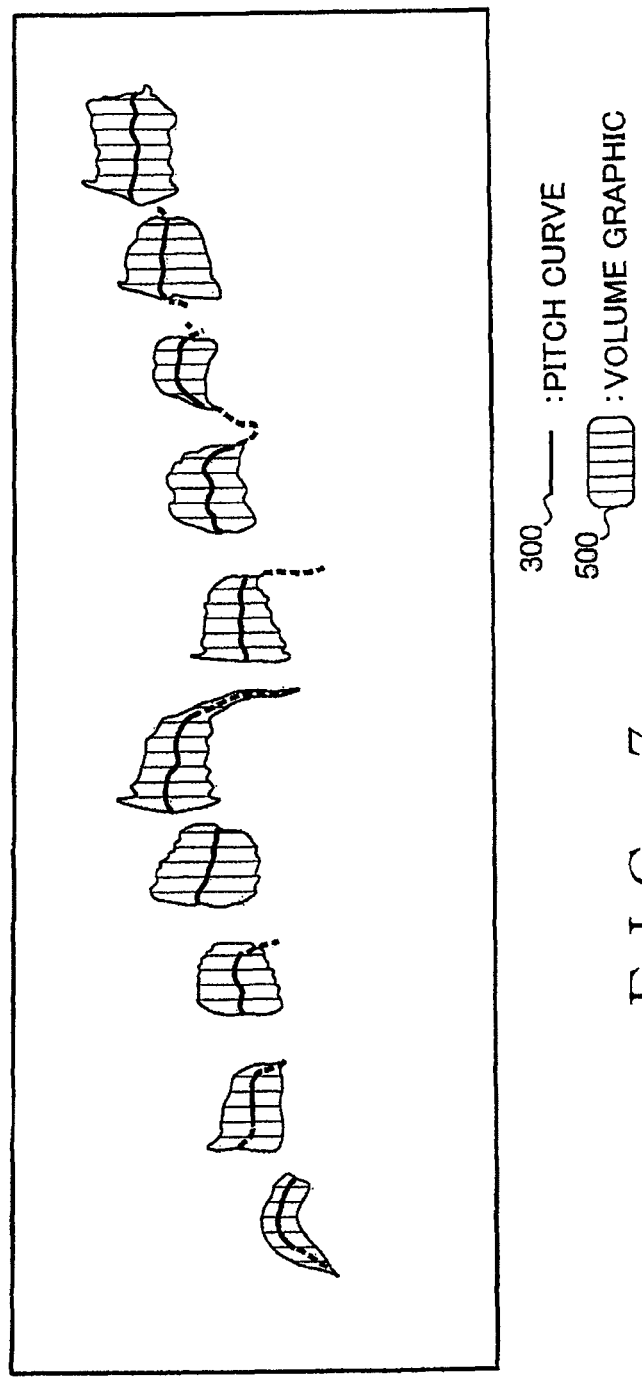
FIG. 7 is a diagram showing an example of a screen displayed on the display section.

Whereas the control section 10 in the embodiment has been described above as displaying, on the display section 40, the pitch curve 300, GM graphic 400 and volume graphic 500 in superimposed relation to one another, the present invention is not so limited, and the control section 10 may display the pitch curve 300 and volume graphic 500 in superimposed relation to each other without displaying the GM graphic 400 as illustratively shown in FIG. 7. As another alternative, the control section 10 may display only the volume graphic 500 without displaying the pitch curve 300 and volume graphic 500. Further, whereas the control section 10 in the embodiment has been described above as displaying the lyrics graphic 600, indicative of lyrics, in addition to the pitch curve 300, GM graphic 400 and volume graphic 500 as illustratively shown in FIG. 5, the control section 10 may be constructed to not display the lyrics graphic.

<Modification 3>

In the above-described embodiment, the analysis section 121 is provided as the attribute data acquisition section in the control section 10 for analyzing user's singing voice data to generate attribute data indicative of attributes of the singing voice and thereby acquire the attribute data. However, the present invention is not so limited, and the attribute data acquisition section in the control section 10 may be constructed to acquire or receive attribute data from a server apparatus or the like connected via a communication network without the control section 10 generating attribute data through user's singing voice data analysis.

<Modification 4>

Figure 8:
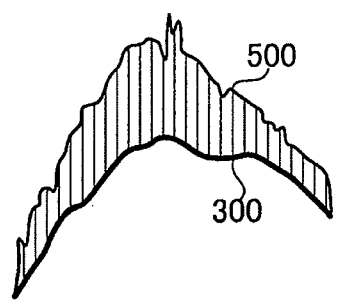
FIG. 8 is a diagram showing another example of the screen displayed on the display section.

Furthermore, in the above-described embodiment, the control section 10 is constructed to display the volume graphic 500 vertically symmetrical with respect to the pitch curve 300, i.e. having a vertical width located both upwardly and downwardly of the center of the pitch curve 300. However, the display of the volume graphic 500 is not so limited, and the control section 10 may display the volume graphic 500 only above the pitch curve 300 as illustratively shown in FIG. 8. In the illustrated example of FIG. 8, a volume level is indicated by a vertical width of the volume graphic 500, and thus, a greater volume level is indicated by a greater vertical width of the volume graphic 500, as in the above-described embodiment. Namely, the control section 10 may display a graphic indicative of another attribute than the attribute becoming a display reference (i.e., reference attribute (pitch in the instant embodiment)) in such a manner that a coordinate position, in one axis direction, of the reference attribute is located at the center or upper or lower end, in the one axis direction, of the graphic indicative of the other attribute. As another alternative, the pitch curve 300 and the volume graphic 500 may be displayed at a predetermined distance from each other in such a manner that displayed positions of the pitch curve 300 and the volume graphic 500 are offset in the vertical-axis direction by a predetermined distance. The control section 10 may be constructed in any desired manner as long as it displays a value of the first attribute by a coordinate position along the second axis intersecting the first axis indicative of the passage of time and displays a graphic indicating a value of the second attribute by a length extending in the second-axis direction from the coordinate position (i.e., coordinate position of the pitch curve 300 in the above-described embodiment).

Figure 9:
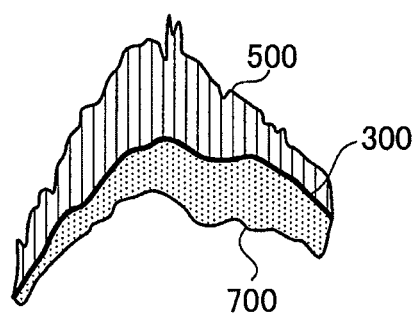
FIG. 9 is a diagram showing still another example of the screen displayed on the display section.

Furthermore, whereas the embodiment has been described above in relation to the case where two types of attributes, i.e. volume and pitch, are displayed, the number of the attributes to be displayed is not limited to two and may be more than two. For example, as shown in FIG. 9, the control section 10 may display three types of attributes, volume, pitch and articulation, using the common time axis. In an image illustrated in FIG. 9, the pitch curve 300 is similar to that in the above-described embodiment, and the volume graphic 500 is displayed above the pitch curve 300 in the vertical-axis direction, and a volume level is indicated by a width in the vertical direction of the volume graphic 500. Further, in FIG. 9, an articulation graphic 700 is representative of articulation of voice as a third graphic indicative of a value of a third attribute articulation is indicated by a width in the vertical direction of the articulation graphic 700. A greater width in vertical direction of the articulation graphic 700 indicates higher articulation. The articulation graphic 700 is displayed below the pitch curve 300 with the pitch curve 300 as a reference. Further, in the case where the number of the attributes to be displayed is three or more, graphics of any two of the three or more attributes may be displayed above and below the pitch curve 300, and a graphic representing another one of the three or more attributes may be displayed at a predetermined distance from the pitch curve.

Furthermore, whereas the preferred embodiment has been described above as displaying the volume graphic 500 with the pitch curve 300 as a reference position (i.e., on the basis of the position of the pitch curve 300), the reference attribute is not limited to the pitch and may be any other suitable attribute of voice. For example, a volume curve where the time is represented by the horizontal axis while volume is represented by the vertical axis may be used as a reference position, and a pitch graphic where pitch is indicated by a displayed width in the vertical-axis direction may be displayed in superimposed relation to the volume curve. In short, the control section 100 only has to display a reference graphic at a position of a coordinate plane where the first attribute is represented by the vertical axis while the passage of time is represented by the horizontal axis and display, and display, at a position corresponding to the coordinate position of the reference graphic, a graphic where a value of the second attribute is indicated by a length in the vertical-axis direction.

Furthermore, the preferred embodiment has been described above as using the volume graphic indicating a value of the volume (second attribute) by a length in the vertical-axis direction. As a modification, such a volume graphic may be replaced with a volume graphic indicating a value of the volume (second attribute) by a color (hue, thickness of color, or the like). In this case, the control section 10 may display the volume graphic 500 in such a manner that the color of the graphic 500 gets thicker as the volume increases and gets thinner as the volume decreases. Alternatively, the control section 10 may display the volume graphic 500 in such a manner that the color of the graphic 500 gets more reddish (by increasing brightness of a red color element while reducing brightness of other color elements) as the volume increases and gets more bluish (by increasing brightness of a blue color element while reducing brightness of other color elements) as the volume decreases. In such a case too (i.e. like in the above-described embodiment), the control section 10 displays a volume graphic at a position corresponding to coordinates of the pitch curve 300. Further, in such a case, individual volume graphics 500 may or may not be the same in shape and size that is, the individual volume graphics 500 may or may not vary in shape and size among then. Namely, in one modification, the scheme of displaying a volume graphic where a value of volume (second attribute) is indicated by a length along the vertical-axis direction may be combined with the scheme of displaying a volume graphic where a value of volume is indicated by a color (hue, thickness of color, or the like) that is, a volume graphic display may be made by a combination of shape and size variations and a color variation.

Furthermore, whereas the preferred embodiment has been described above as displaying the pitch curve 300 and the volume graphic 500 with the horizontal axis as the time axis and the vertical axis as the pitch axis, the present invention is not so limited, and the horizontal and vertical axes may be set in any other manners as along as the control section 10 can display a graphic where a value of the reference attribute is indicated by a displayed position in one axial direction and the passage of time is indicated by the time axis.

<Modification 5>

In the above-described preferred embodiment, the control section 10 is constructed to store user's singing voice data into the user's singing voice data storage area 25 and perform an analyzed result display process upon termination of the user's singing. However, the present invention is not so limited, and the control section 10 may perform the analyzed result display process in real time during the user's singing.

Further, in the above-described preferred embodiment, the control section 10 is not only constructed to reproduce a karaoke music piece and record user's singing voice, but also constructed to, upon termination of reproduction of a karaoke music piece, analyze user's singing voice data to display the analyzed result (i.e., result of the user's singing voice data analysis). However, the present invention is not so limited, and the control section 10 may be constructed to perform the analyzed result display process on previously-recorded user's singing voice data (i.e., voice data prestored in the storage section 20) and then perform the analyzed result display process.

Furthermore, whereas the control section 10 in the above-described preferred embodiment is constructed to compare a pitch of singing voice and a pitch of the GM data and perform the evaluation process on the basis of a result of the comparison, the evaluation process may be performed in any other desired manner. For example, the control section 10 may calculate an evaluation value, i.e. an evaluation result, for a given evaluation item by use of any of various conventionally-known schemes, such as frequency analysis using the FFT or the like, or volume analysis.

Furthermore, whereas the control section 10 in the above-described embodiment is constructed to analyze and user's (singer's) singing voice, the control section 10 may analyze and evaluate performance sound generated by the user performing a musical instrument rather than user's singing voice. Namely, as noted above, the term "sound" used herein refers to any of various types of sounds, such voice uttered by a human and performance sound generated by a musical instrument.

<Modification 6>

As another modification, two or more apparatus interconnected via a communication network may share the functions of the preferred embodiment of the karaoke apparatus 100 of the present invention, so that a system comprising these apparatus can implement the karaoke apparatus 100. For example, a computer apparatus including a microphone, speaker, display device, operation section, etc. and a server apparatus that performs a sound analysis process may be constructed as a system by being interconnected via a communication network. In such a case, the computer apparatus may convert each sound, picked up by the microphone, into an audio signal and transmit the audio signal to the server apparatus, and the server apparatus may analyze the received audio signal and transmit results of the analysis to the computer apparatus.

<Modification 7>

Furthermore, whereas the embodiment has been described above in relation to the case where the display control apparatus of the invention is applied to a karaoke apparatus that not only reproduces a karaoke accompaniment but also scores singing voice, the display control apparatus of the invention may be applied to any other apparatus than a karaoke apparatus as long as the other apparatus is an apparatus that analyzes sound data and displays a analyzed result of sound data. Namely, the display control apparatus of the present invention may be applied to various types of apparatus, such as an apparatus that displays an analyzed result of sound, an apparatus that performs sound synthesis and editing, and an apparatus provided with a function for supporting language study. In the case where the display control apparatus of the present invention is applied to a sound editing apparatus, for example, a user can intuitively grasp a plurality of attributes of sound by simultaneously displaying the plurality of attributes of the sound by use of a common time axis thus, sound synthesis and editing can be facilitated.

Furthermore, whereas the embodiment has been described above as using the GM data as model attribute data indicative of an attribute of model sound, other data than the GM data may be used as the model attribute data. For example, in the case where the display control apparatus of the present invention is applied to a sound editing apparatus, data obtained by rounding the analyzed result to a twelve-tone scale may be used as the model attribute data. In this case, like in the above-described preferred embodiment, the control section 10 displays a graphic indicative of the analyzed attribute and a graphic indicative of the model attribute data as illustratively shown in FIG. 5. In short, the model attribute data may be any data as long as it is indicative of an attribute of model sound.

<Modification 8>

The present invention may be practiced not only as the display control apparatus, but also as a method for realizing such a display control apparatus and a program for allowing a computer to implement the display control function. Such a program may be supplied in a storage medium, such as an optical disk, having the program stored therein, or may be supplied by being downloaded and installed to a computer via the Internet or the like.

This application is based on, and claims priority to, JP PA 2011-286727 filed on 27 Dec. 2011. The disclosure of the priority applications, in its entirety, including the drawings, claims, and the specification thereof, are incorporated herein by reference.

What is claimed is:

1. A display control apparatus comprising:
a processor configured to:
acquire attribute data indicative of three or more attributes of given sound data; and
perform control for displaying, on a display device, variations over time in values of the three or more attributes indicated by the acquired attribute data, wherein, on a coordinate plane with a first axis indicative of passage of time and a second axis intersecting said first axis, a value of a first attribute of the three or more attributes is displayed by a coordinate position along said second axis, and a first graphic is also displayed where a value of a second attribute of the three or more attributes is indicated by a length of the first graphic extending in a direction of said second axis, wherein the second attribute is independent of the first attribute,
wherein the processor is further configured to perform control for displaying said first graphic in such a manner that the coordinate position indicative of the value of said first attribute is located at a center or upper or lower end, in the direction of said second axis, of said first graphic,
wherein said processor is further configured to perform control for displaying, on the display device, a second graphic, indicative of the value of said first attribute, in association with the coordinate position indicative of the value of said first attribute, and
wherein said processor is further configured to perform control for displaying, on the display device, a third graphic, indicative of a third attribute of the three or more attributes, in association with the coordinate position indicative of the value of said first attribute.

2. The display control apparatus as claimed in claim 1, wherein said processor is further configured to receive model attribute data indicative of a model value of said first attribute, and perform control for displaying, on the coordinate plane, a graphic representative of the model value indicated by the model attribute data.

3. The display control apparatus as claimed in claim 2, wherein said processor is further configured to perform control for displaying related information near the graphic representative of the model value indicated by the model attribute data.

4. The display control apparatus as claimed in claim 1, wherein said processor is configured to perform the control for displaying such that the coordinate position indicative of the value of said first attribute and a displayed position of said second graphic are offset from each other by a predetermined distance in the direction of said second axis.

5. The display control apparatus as claimed in claim 1, wherein said processor is further configured to perform the control for displaying such that the coordinate position indicative of the value of said first attribute is displayed above or below said first graphic in the direction of said second axis, or disposed superimposed on said first graphic.

6. The display control apparatus as claimed in claim 5, wherein said processor is configured to perform the control for displaying such that the coordinate position indicative of the value of said first attribute and a displayed position of said second graphic are offset from each other by a predetermined distance in the direction of said second axis.

7. The display control apparatus as claimed in claim 1, wherein said processor is configured to perform the control for displaying such that the coordinate position indicative of the value of said first attribute is displayed above or below said third graphic in the direction of said second axis.

8. The display control apparatus as claimed in claim 7, wherein said processor is configured to perform the control for displaying such that the coordinate position indicative of the value of said first attribute and a displayed position of said third graphic are offset from each other by a predetermined distance in the direction of said second axis.

9. The display control apparatus as claimed in claim 1, wherein said processor is further configured to perform control for changing a color of said first graphic in accordance with a value of said second attribute.

10. A computer-implemented method comprising:
an acquisition step of acquiring, by a processor, attribute data indicative of three or more attributes of given sound data;
a step of performing, by a processor, control for displaying, on a display device, variations over time in values of the three or more attributes indicated by the attribute data acquired by said acquisition step, wherein, on a coordinate plane with a first axis indicative of passage of time and a second axis intersecting said first axis, a value of a first attribute of the three or more attributes is displayed by a coordinate position along said second axis, and a first graphic is also displayed where a value of a second attribute of the three or more attributes is indicated by a length of the first graphic extending in a direction of said second axis, wherein the second attribute is independent of the first attribute,
wherein the step of performing control includes performing control for displaying said first graphic in such a manner that the coordinate position indicative of the value of said first attribute is located at a center or upper or lower end, in the direction of said second axis, of said first graphic,
wherein the step of performing control includes performing control for displaying, on the display device, a second graphic, indicative of the value of said first attribute, in association with the coordinate position indicative of the value of said first attribute, and
wherein the step of performing control includes performing control for displaying, on the display device, a third graphic, indicative of a third attribute of the three or more attributes, in association with the coordinate position indicative of the value of said first attribute.

11. A non-transitory computer-readable storage medium containing a group of instructions for causing a computer to perform a method for displaying a plurality of attributes included in sound data, said method comprising:
an acquisition step of acquiring attribute data indicative of three or more attributes of given sound data;
a step of performing control for displaying, on a display device, variations over time in values of the three or more attributes indicated by the attribute data acquired by said acquisition step, wherein, on a coordinate plane with a first axis indicative of passage of time and a second axis intersecting said first axis, a value of a first attribute of the three or more attributes is displayed by a coordinate position along said second axis, and a first graphic is also displayed where a value of a second attribute of the three or more attributes is indicated by a length of the first graphic extending in a direction of said second axis, wherein the second attribute is independent of the first attribute,
wherein the step of performing control includes performing control for displaying said first graphic in such a manner that the coordinate position indicative of the value of said first attribute is located at a center or upper or lower end, in the direction of said second axis, of said first graphic,
wherein the step of performing control includes performing control for displaying a second graphic, indicative of the value of said first attribute, in association with the coordinate position indicative of the value of said first attribute, and
wherein the step of performing control includes performing control for displaying a third graphic, indicative of a third attribute of the three or more attributes, in association with the coordinate position indicative of the value of said first attribute.

* * * * *